United States Patent

Korman

[11] 3,895,383
[45] July 15, 1975

[54] RADAR SYSTEM WITH A VERY SHORT PULSE LENGTH

[75] Inventor: Nathaniel I. Korman, Merchantville, N.J.

[73] Assignee: RCA Corporation, New York, N.Y.

[22] Filed: Jan. 25, 1950

[21] Appl. No.: 140,482

[52] U.S. Cl. .............................................. 343/7.3
[51] Int. Cl. ........................................... G01s 9/14
[58] Field of Search .................................. 343/7.3

[56] References Cited
UNITED STATES PATENTS

| | | | |
|---|---|---|---|
| 2,445,584 | 7/1948 | Ramo | 343/7.4 |
| 2,449,985 | 9/1948 | Cloess | 250/20.52 |
| 2,454,415 | 11/1948 | Tourshou | 250/20.45 |
| 2,468,703 | 4/1949 | Hammel | 343/7 |
| 2,491,029 | 12/1949 | Brunn | 343/13 |
| 2,495,753 | 7/1950 | Mozley | 343/7.4 |
| 2,516,356 | 7/1950 | Tull | 343/7 |
| 2,520,489 | 8/1950 | Bergmar et al. | 343/7 |
| 2,543,072 | 2/1951 | Stearns | 343/13 |
| 3,267,465 | 8/1966 | Cuthbert | 343/7.3 |

FOREIGN PATENTS OR APPLICATIONS

| | | | |
|---|---|---|---|
| 588,187 | 5/1947 | United Kingdom | 343/7 |
| 600,546 | 4/1948 | United Kingdom | 343/7 |
| 600,945 | 4/1948 | United Kingdom | 343/7 |

*Primary Examiner*—T. H. Tubbesing
*Attorney, Agent, or Firm*—Edward J. Norton

EXEMPLARY CLAIM

1. A pulse-echo system comprising a transmitter for transmitting a narrow pulse of radio frequency energy, a receiver for receiving said pulse after reflection from a reflecting object, said receiver being of the superheterodyne type and comprising an intermediate frequency amplifier consisting of a plurality of amplifier stages and having a narrow frequency pass band, means for producing a gating pulse adjustable in timing and having a width sufficiently narrow to provide the desired definition or resolution, said gating pulse and said transmitted pulse having substantially the same width, said narrow frequency pass band being so narrow as to seriously distort or widen a pulse as narrow as said gating pulse if passed through the intermediate frequency amplifier, means for applying said gating pulse to said receiver at a point preceding the narrow pass band stages of said intermediate frequency amplifier to make said receiver effective to pass signal to said narrow pass band stages only during the application of said gating pulse, and means for obtaining distance information that is a function of the phasing or timing of said gating pulse whereby the distance to the reflecting object is obtained.

8 Claims, 8 Drawing Figures

INVENTOR
Nathaniel I. Korman

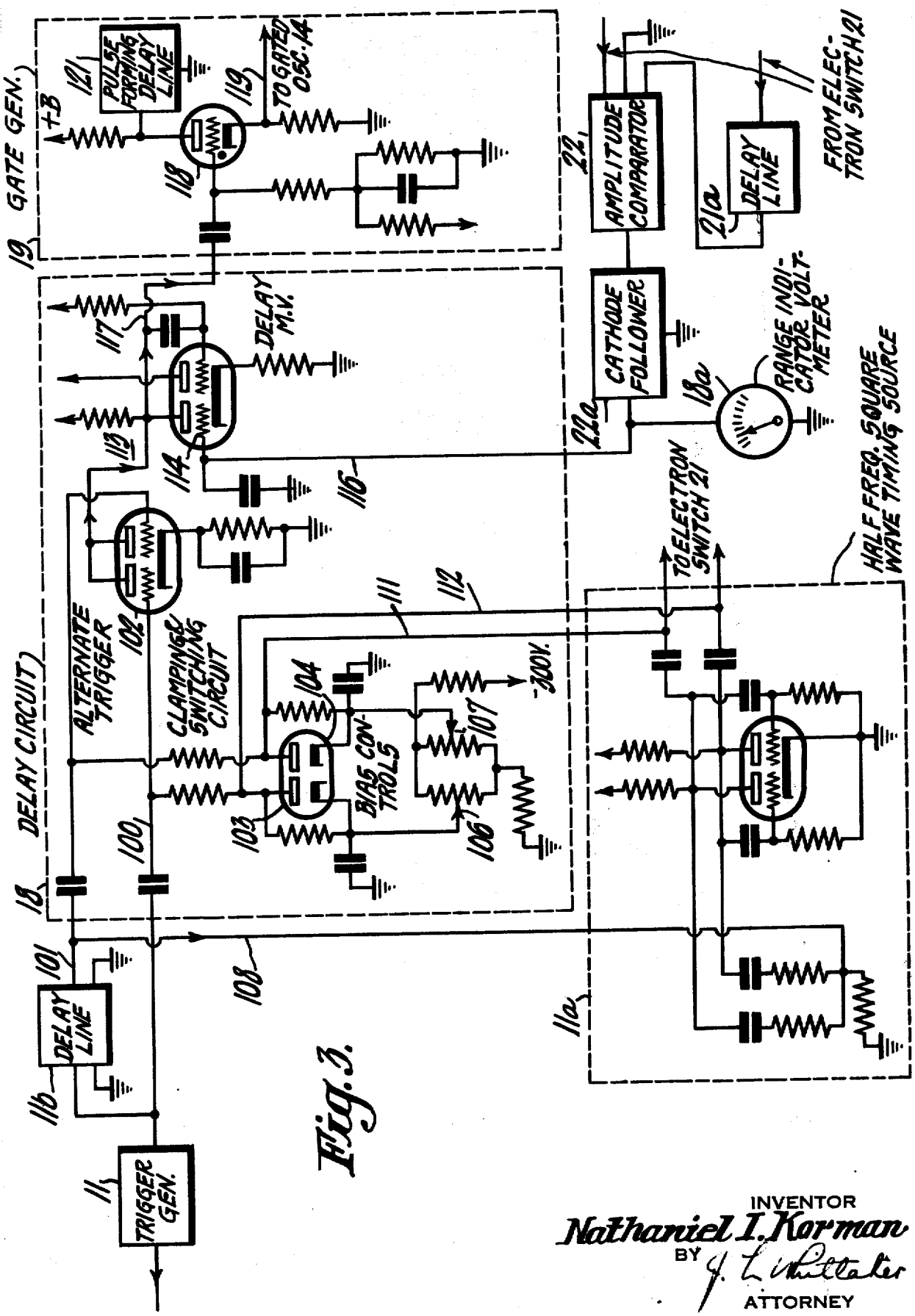

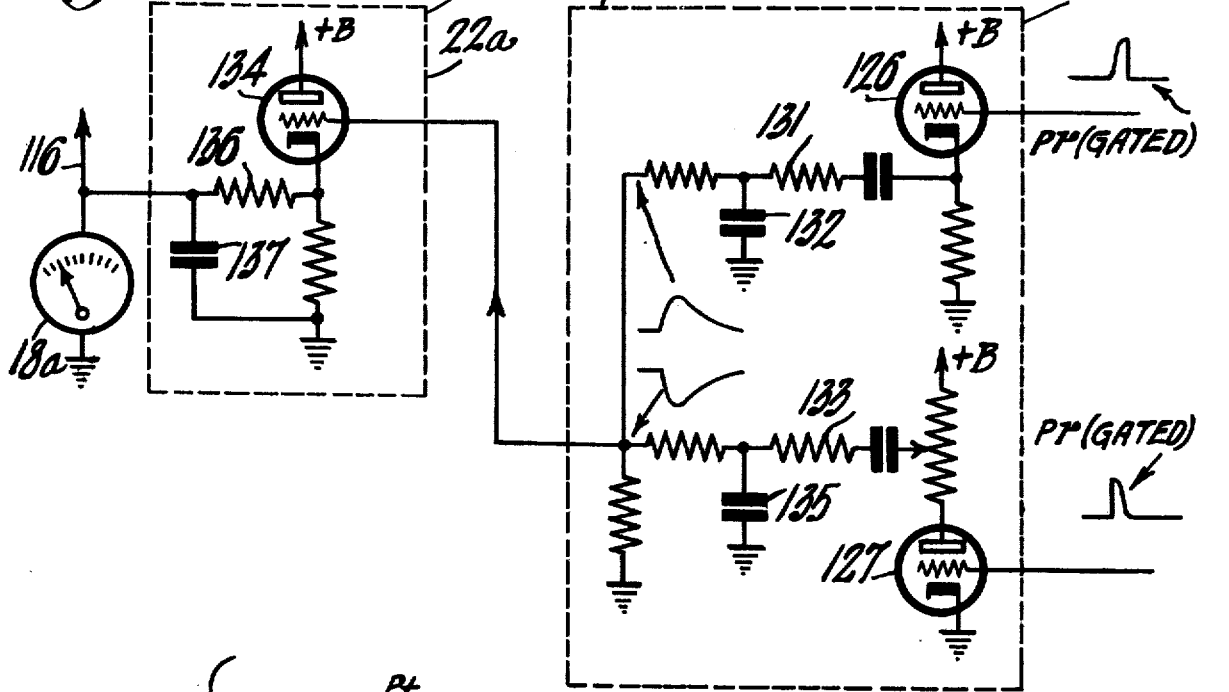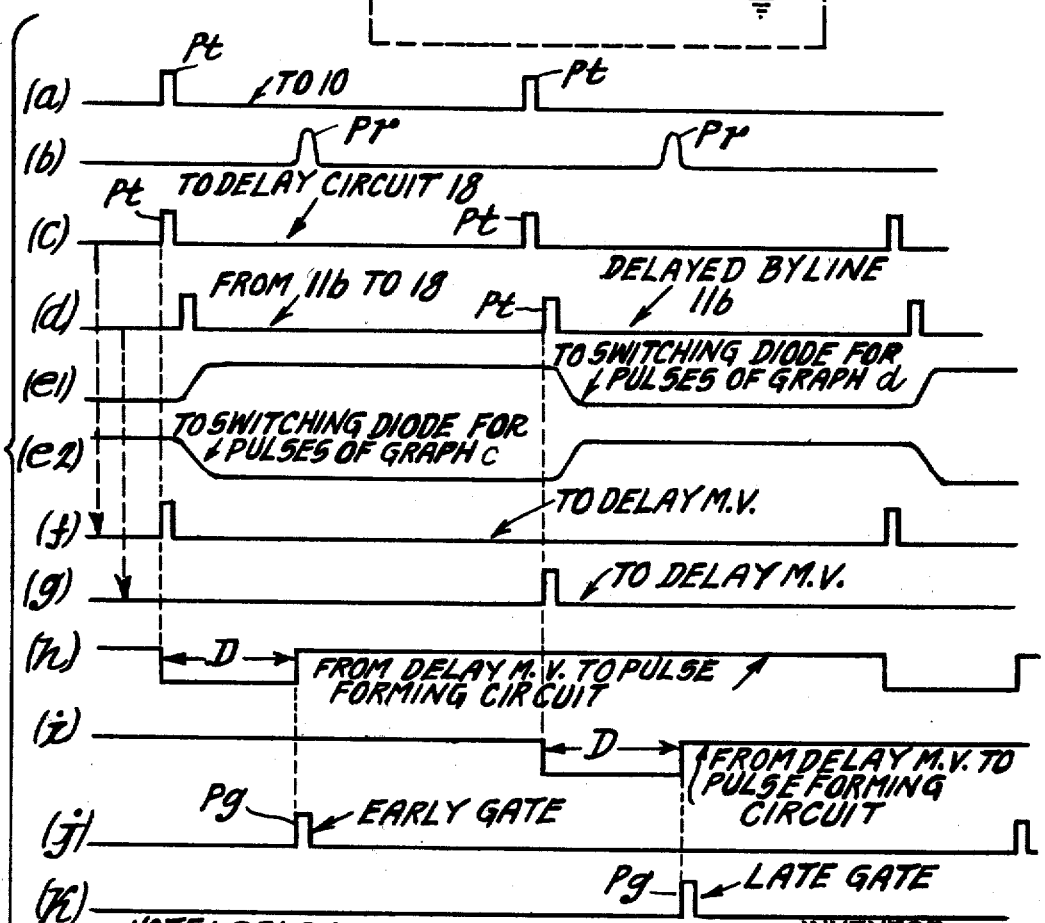

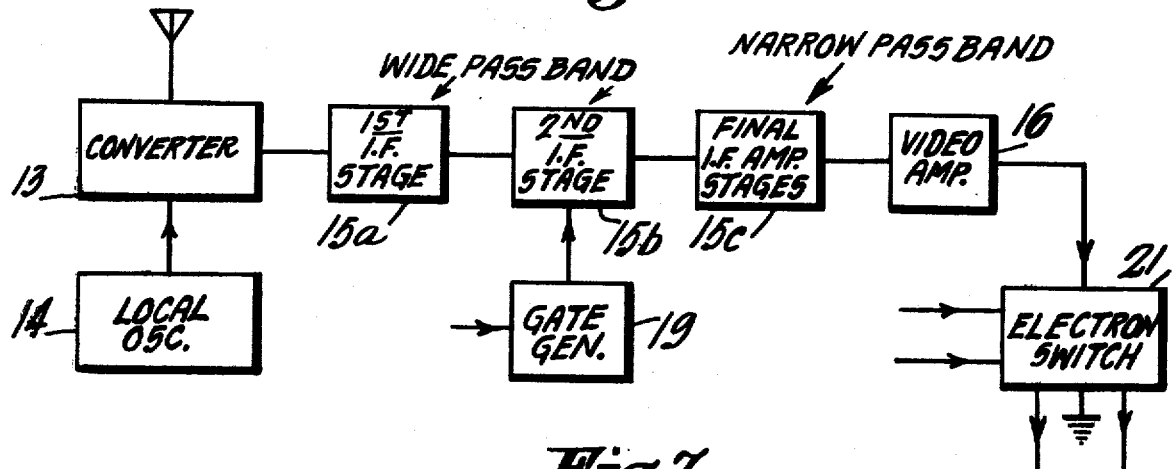
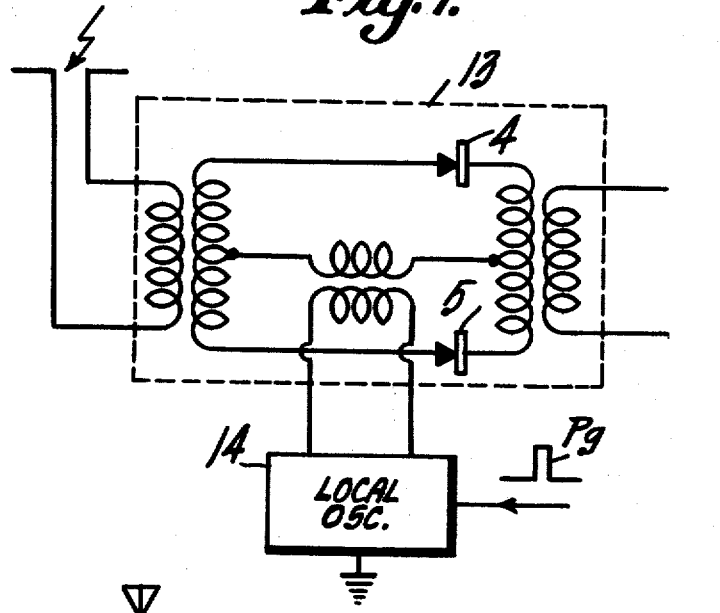
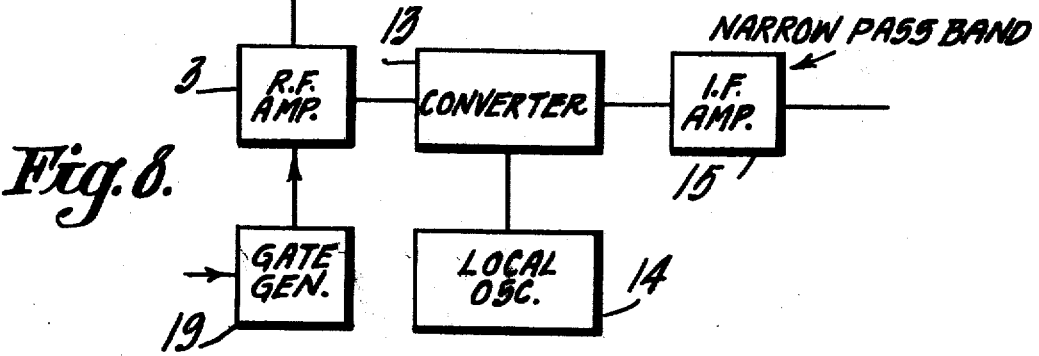

RADAR SYSTEM WITH A VERY SHORT PULSE LENGTH

This invention relates generally to radio pulse-echo systems, and more particularly to such systems in which a narrow pulse width is employed to obtain a high degree of range definition.

In radio pulse-echo systems which are utilized to determine distance or altitude by measuring the time required for a transmitted pulse to travel from the transmitter to a reflecting object and back to a receiver located in the vicinity of the transmitter, it is often desirable to employ a narrow width transmitted pulse so that accurate observations of short distances or low altitudes may be made. A broad pulse will often partially obscure or interfere with the reception of the reflected pulse at short distances if the pulse width represents a time interval which is equal to or greater than the time required for the leading edge of the pulse to travel from the transmitter to the reflecting object and back to the receiver. In pulse-echo systems which are to be employed in a manner in which accurate measurement of short distance are critical, as for example, in altimeter systems for aircraft, or in distance finders in fire control systems for gun laying, the pulse width is preferably made as narrow as practical within the limits defined by the associated circuits of the pulse-echo system.

A primary limitation in this respect results from the fact that the rectangular transmitted pulse employed in such systems, in order to effect instantaneous receiver responses by the vertical leading edge of the pulse, is essentially composed of a number of sine waves having different amplitudes and frequencies. In order for a receiver system to pass this combined non-sinusoidal wave or pulse form without distorting the vertical leading edge of the wave, it is apparent that the receiver system must be capable of passing all the component frequencies of the wave form without causing a relative phase shift between the component sine waves and without changing their amplitudes. This transient effect can be avoided for the most part by providing a receiver which has a sufficiently wide pass band to give a uniform response to all of the component frequencies. On the other hand, a wide band response will result in an excessively complicated, or even impractical, receiver.

In a receiver provided with the necessary high signal-to-noise ratio, the band width necessary to obtain the desired flat response of the receiver is an inverse function of the pulse width. When extremely narrow pulse widths are employed, for example, on the order of 0.05 microseconds, the receiver band width necessary for a flat response is impractically large. This may be illustrated by calculating the band width necessary for a satisfactory receiver response in the instance a pulse width of 0.05 microseconds is employed according to the generally employed empirical equation in which the band width in megacycles per second is approximately 1.5 divided by the pulse width in microseconds. It is thus indicated that a satisfactory band response, one that compromises between that which is wide enough to pass the non-sinusoidal pulse without distortion of its leading edge and that which is narrow enough to suppress the noise level, is in the neighborhood of 30 megacycles per second. It is, of course, hardly practical to design an IF amplifier having a band width of the indicated width, and consequently considerable distortion and lack of range definition in the indicator would result when a narrow pulse width is employed in conjunction with a receiver having a narrower band response.

Heretofore, it has been a common expedient to utilize a voltage having a rectangular wave form to sensitize various receiver circuits during certain phases of the operation of pulse-echo systems. Most generally, receiver gating has been applied to the various amplifier stages of the receiver system in order to protectively isolate the receiver from the transmitter during the interval of pulse transmission by the transmitter. In some instances, the gating pulse is made movable with respect to certain transmitted pulses so that the receiver is selectively sensitized for the reception of pulses being reflected from within a certain prescribed zone or distance from the receiver. In these and other adaptations of receiver gating, however, the gating pulses applied to the receiver circuits are substantially broader than the transmitted pulses or are applied to the video frequency amplifier.

One of the objects of this invention is to provide means and methods by which the high degree of range definition inherent in a pulse-echo system employing a narrow pulse width may be realized while utilizing a receiver having a narrow band response.

A further object of the invention is to provide methods of and means for gating circuits in a receiver having a narrow band response, whereby a narrow pulse may be utilized to obtain a high degree of range definition in the associated indicator circuits.

A further object of this invention is to provide a method of and means for applying a gating pulse having a width substantially the same as the width of the transmitted pulse to certain of the receiver circuits to effect a marked improvement in range definition.

A further object of this invention is to provide a method of and means for utilizing a receiver having a narrow band response with a narrow width transmitted pulse and obtaining therewith a high degree of range definition by applying a gating pulse that has a width substantially equal to the width of the transmitted pulse to certain of the receiver circuits.

Further objects and advantages of the invention will be apparent from the following description made with reference to the accompanying drawings in which similar parts are indicated by similar reference characters and in which:

FIGS. 3 and 4 are circuit diagrams of portions of the circuits shown in block diagram in FIG. 1;

FIG. 5 is a set of graphs that are referred to in explaining the circuit operation;

FIG. 6 is a block diagram that illustrates a second embodiment of the invention;

FIG. 7 is a schematic diagram showing in detail a portion of the embodiment of FIG. 1; and FIG. 8 is a block diagram that illustrates another embodiment of the invention.

Figure 1:
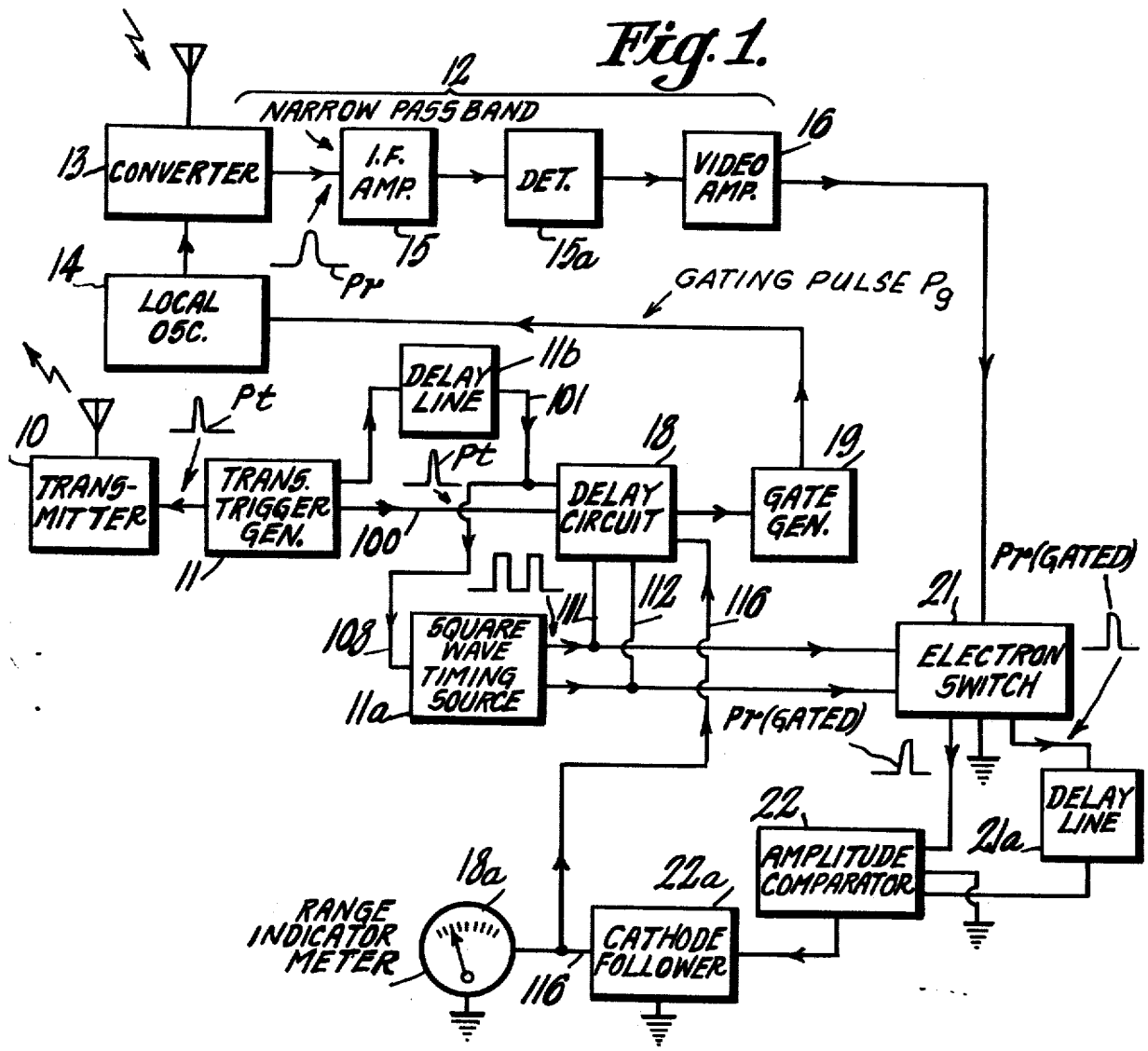
FIG. 1 is a block diagram of one embodiment of the invention as it may be applied to a range-finding system that includes an automatic tracking system.

Preliminarily, it should be noted that the terms "narrow transmitted pulse width" and "narrow receiver band response" are essentially relative terms. As employed herein a narrow transmitted pulse width is considered to be one in the order of between 0.01 and 1.0 microseconds in duration. As previously specified, the band response of a receiver with respect to being narrow or broad is related to the transmitted pulse width with which it is employed, and that the band response of the receiver may be considered to be on the boundary of being termed "narrow" when the band response in megacycles approximates 1.5 divided by the pulse width in microseconds. Accordingly, as herein employed, a narrow receiver band response comprises those in which the band response in megacycles is approximately equal to the reciprocal of the transmitted pulse width in microseconds, or less than the value so determined.

For purposes of facilitating an understanding of the invention it will be assumed that the pulse-echo system herein described employs a narrow transmitted pulse width of, say, 0.05 microseconds. In this instance an associated receiver having a band response of 20 megacycles, or less, is considered as having a "narrow band response" according to the prescribed definition. In practice, however, this invention makes it feasible to reduce the designed band response of the receiver considerably below 20 megacycles when a transmitted pulse width of 0.05 microseconds is employed. For example, it has been found that a high degree of range definition is obtainable with a receiver band pass between 0.1 and 1.0 megacycles.

The invention will be described, by way of example, with reference to the type of gating circuit described in application Ser. No. 122,233 filed Oct. 19, 1949 in the name of A. Donald Arsem. In the Arsem system the early and late gate pulses occur during successive received pulses, respectively. The present invention applies equally well, for example, to a gating system where the early and late gating pulses both occur during the occurrence or reception of each received pulse.

Before referring to the circuits of the drawing it may be pointed out that in the system of the present invention it is necessary to obtain the range information from the gating circuit. With the gating circuit servo operated as described, the range information is continuously presented. The range information cannot be presented accurately on the usual cathode ray tube indicator fed from the I.F. and video frequency amplifiers for the reason that the narrow band I.F. amplifier employed as one feature of the present invention will broaden or "smear" the received pulses.

It will be noted that the gating pulses perform a double function, that is, they act as a gate to exclude pulses reflected from undesired targets and they act to provide precise range information. By properly gating the circuit according to the present invention it is possible to employ an I.F. amplifier having a narrow pass band and thus avoid the difficulties that would be encountered if the I.F. amplifier had to be designed to be substantially non-distorting.

In the pulse-echo system embodying the invention as illustrated in FIG. 1, a succession of pulses P of high frequency radio energy are transmitted by the transmitter 10. The transmitter is triggered by the pulse Pt generated by the transmitter trigger generator 11 which has a pulse repetition rate hereinafter designated as F. As explained hereinafter, trigger generator 11 also controls a square wave timing source 11a that generates a square wave at half the repetition frequency (F) or F/2.

The transmitted pulses may be assumed to be reflected from a remote object or surface to the antenna of the receiver and subsequently passed to the receiver designated generally as 12. The receiver comprises a converter or mixer 13 and a local heterodyne oscillator 14. The received pulses are heterodyned to an intermediate frequency in the converter 13 and passed to the latter stages of the receiver, namely the I.F. amplifier 15 and second detector 15a and thence to the video amplifier 16. The I.F. amplifier 15 has a narrow pass band as previously described.

The means for measuring the elapsed time between a pulse transmission and its reflected reception, and accordingly for determining the distance to the reflecting object, comprises a delay circuit 18 (shown in detail in FIG. 3) to which is applied the pulse Pt of the transmitter trigger generator in both delayed and undelayed form, the delayed pulse Pt being obtained by means of a delay line 11b. The function of the delay circuit 18 is to introduce a measurable delay time which will permit the output of the delay circuit to be matched against the occurrence of any particular one of the received pulses, thus furnishing a basis for determining the time elapsed between the transmission of the pulse and the time of its return at the receiver. The time interval thus determined may, of course, be translated into a linear measurement corresponding to the distance between the system and the reflecting object or surface and indicated on a range indicator meter 18A. The output of the delay circuit 18 consists of early and late pulses, i.e., alternate pulses are delayed with respect to the others as described in connection with FIG. 3. The pulses from circuit 18 trigger a gating pulse generator 19.

The gating pulses Pg thus produced by gate pulse generator 19 are applied to the gated local oscillator 14 in accordance with one embodiment of the present invention. The gated oscillator 14 will be caused to oscillate only during the application of a gating pulse. As the rate of repetition of the gating pulse Pg is determined by the output of the transmitter trigger generator 11, the gating pulses Pg will have the same repetition rate as the transmitted pulses P and the received pulses Pr. Accordingly, as the successive received pulses Pr (see FIGS. 1 and 2) are reflected from an object at a distance which corresponds to the time delay introduced in the delay circuit 18, these received pulses are converted to I.F. pulses and passed through the narrow band I.F. amplifier 12.

It should be noted that in accordance with the present invention the gating pulses are applied to the circuit at a point preceding the narrow pass band stages of the I.F. amplifier. As will be pointed out hereinafter, the gating pulses may be applied to an early stage of the I.F. amplifier rather than to the local oscillator if preferred.

The gating pulses Pg are employed to effect an early and late gating of a suitable gated circuit such as the gated local oscillator 14 with respect to the peaks of the received pulses which, in conjunction with means for resolving the difference in amplitude of the early and late gated outputs of the I.F. amplifier, provides an exact measurement of the elapsed time of pulse propagation, as well as making it possible to follow variations in the elapsed time of propagation of pulses reflected from a particular object or surface as the object or surface moves relative to the receiver.

The early and late gating of the single channel receiver is accomplished by utilizing the voltage controlled delay circuit 18 in cooperation with the output of the square wave timing source 11a, which, as stated hereinbefore, has an output repetition rate of one-half that of the transmitter trigger generator 11.

Figure 2:
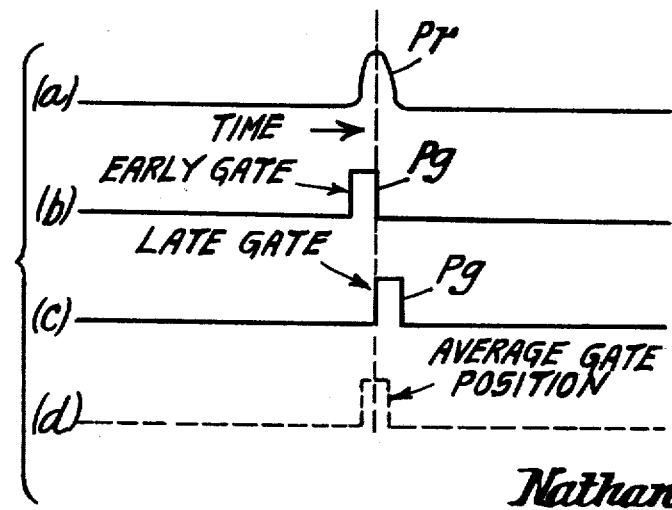
FIG. 2 is a set of graphs illustrating the relationship of time of occurrence of the gating pulse and the successive received pulses passed by the receiver.

The manner in which the square wave timing circuit 11a and the delay circuit 18 cooperate to form the early and late gating will be better understood by reference to FIG. 2. In FIG. 2(a), Pr represents successive received pulses in the train of pulses reflected from a particular object or surface. The output of delay circuit 18, which controls the gate generator 19 and hence the timing of pulses Pg, operates on a d-c bias voltage supplied from an amplitude comparator 22 and a cathode follower 22a. The inputs to delay circuit 18 are the output pulses of trigger generator 11 applied at repetition frequency F and the output of the square wave timing source 11a applied at the repetition frequency of F/2. The output of the square wave timing circuit 11a switches the delay circuit as described hereinafter in connection with FIG. 3 so that it passes early and late gate pulses alternately, the early gate being positioned, for example, as shown at FIG. 2(b) and the late gate being positioned as shown at FIG. 2(c).

The d-c bias voltage of the delay circuit 18 is adjusted so that the average position of the late and early gates is centered with respect to the peaks of received pulses as indicated in FIG. 2(d). As the repetition rate of the square wave produced by the circuit 11a is one-half that of the pulse repetition rate of the received pulses, the gating pulse Pg will shift from the early to the late gate position alternately with the reception of successive pulses. Accordingly, the late gate will overlap the trailing side of the received pulse Pr and the early gate will overlap the leading side of the successive pulse Pr. In the instance the gates are centered with respect to the peak or center of the received pulse, the gated amplifier outputs corresponding to the early and late gates will be the same. If, however, the time of occurrence of the received pulse is varied as a result of the reflecting object moving toward or away from the system, one gate will overlap a larger portion of the received pulse than the other and the successive outputs of the gated amplifier will reflect a corresponding difference in amplitude. This difference in amplitude in successive outputs may be resolved to produce an error or control voltage signal which may be applied to the delay circuit to re-position the time of occurrence of the gating pulse Pg with respect to the received pulse. The control voltage necessary to re-position the circuit in a balanced condition is, of course, a function of the distance which the reflecting object has moved with respect to the receiver.

While the early and late gating pulses are shown in FIG. 2 with the late gating pulse displaced in time so that its leading edge substantially coincides with the trailing edge of the early gating pulse, it should be understood that this specific gating pulse arrangement is not necessary to obtain the circuit operation just described. For example, the early and late gating pulses may overlap a certain amount but any such overlap preferably is less than the width of the received pulse. Also, if desired, the early and late gating pulses may be spaced so that the late gating pulse has its leading edge occurring after the trailing edge of the early gating pulse by some amount that preferably is no greater than the width of the received pulse. The various suitable adjustments in the relative timing of the early and late gating pulses will be apparent to those skilled in the art. As to the width of each gating pulse, the width should be narrow as previously described in order to obtain good definition or resolution in range.

Comparison of the amplitude of the signals passed through the single receiver channel as heretofore described may be accomplished by supplying the output of the I.F. amplifier 15 through a detector 15a and a video amplifier 16 to the electron switch 21. The electron switch 21 is controlled by the square wave timing circuit 11a having a pulse repetition rate equal to one-half that of the repetition rate of the received pulses. Accordingly, successive pulses are diverted into the alternate output channels by the electron switch 21. Since little gain is necessary at this stage, this switch may comprise highly degenerative amplifiers made very stable with respect to gain variation. One simple form of electron switch may consist of two vacuum tubes, each having a control grid and a screen grid, the tubes having a common input and separate outputs. The switching wave from source 11a may be applied to the screen grids of the two tubes so that they pass signal alternately. The pulses Pr thus diverted into the alternate output channels of the electronic switch 21 are supplied to an amplitude comparison circuit 22.

The comparison circuit 22 may be as shown in FIG. 4 and described hereinafter or it may comprise grid-leak biased amplifier tubes that function as peak rectifiers and which have their output circuits connected in balance relation. In the event the amplitude of the pulses Pr are equal the direct current output of the circuit 22 will be zero. If the peak values of the incoming pulses are not equal, a d-c voltage will be developed which may be applied to the delay circuit 18 to re-adjust the time of occurrence of the gating pulse Pg with respect to the center or peak of the received pulses. In order to bring the two successive pulses Pr in coincidence in time so that effective comparison may be accomplished in the circuit 22, a time delay network 21a may be incorporated into the output channel of the electron switch passing the early gated pulse.

FIG. 3 illustrates, by way of example, suitable circuits for the delay circuit 18, the square wave source 11a and the gate generator 19. These circuits and their operation will be described with reference to the graphs of FIG. 5.

The trigger pulse Pt undelayed, FIG. 5(c), and the trigger pulse Pt delayed, FIG. 5(d), are applied through leads 100 and 101, respectively, to the grids of a double triode 102 and also to diodes 103 and 104, respectively, which act as both clamping and switching diodes. The clamping diodes insure the proper bias level on the alternate trigger tube 102 as determined by the bias controls 106 and 107.

The half frequency source 11a is a conventional multivibrator that is triggered by delayed pulses Pt supplied over a lead 108. The outputs of 11a, FIG. 5(e1) and FIG. 5(e2), are applied over leads 111 and 112 to the diodes 103 and 104 so that they alternately bias on the input of alternate trigger tube 102 whereby tube 102 passes first Pt undelayed and then Pt delayed to the delay multivibrator 113. The pulses thus applied to delay multivibrator 113 are shown at (f) and (g), FIG. 5.

The manner in which the switching circuit operates will be apparent by reference to FIG. 5 if it is remembered that when a positive wave is applied to either diode 103 or to diode 104 this positive wave is also applied to the associated grid of tube 102 and reduces the bias of the associated section of tube 102. In the absence of a positive wave on the anode of a diode, the associated section of tube 102 is biased beyond cut-off. When the switching voltage is negative on the anode of either diode 103 or 104, the input of its associated section of tube 102 is biased below cut-off to prevent passage of a pulse. Thus, referring to FIG. 5 (c) and FIG. 5(e2), it will be seen that the first undelayed pulse Pt occurs while the switching wave (e2) which is applied to diode 103 is still in the positive direction. Thus, said first undelayed pulse Pt is passed as shown by FIG. 5 (f). During the occurrence of the first delayed pulse Pt shown at FIG. 5 (d), the other switching wave (e1) applied to diode 104 is negative so that said delayed pulse is not passed.

The second undelayed pulse Pt is not passed because at that time the switching wave (e2) is negative. The second delayed pulse Pt is passed because during its occurrence the switching wave (e1) is positive.

The delay multivibrator 113 is of the well known cathode coupled type although other types of delay multivibrators may be employed. The delay multivibrator 113 produces an output pulse that is delayed by an amount D (FIG. 5) with respect to the instant of triggering that is a function of the d-c bias applied to the grid 114 by way of lead 116. This is shown by the graphs (h) and (i) of FIG. 5. It will be noted that the delayed pulses of graphs (h) and (i) are early and late, respectively, with respect to the received pulses Pr by virtue of the delay introduced by delay line 11b.

The output of delay multivibrator 113 is applied over a lead 117 to the gate generator 19 which produces the early and late gating pulses Pg as shown in graphs (j) and (k) of FIG. 5. These pulses appear at the cathode of a gas or vapor tube 118 and are supplied over a lead 119 to the gated local oscillator 14.

The gate generator 19 is shown, by way of example, as comprising a pulse forming delay line 121 and the tube 118 for periodically discharging the line 121 thereby producing the pulses Pg having a width or duration equal to the time of travel of a wave down the delay line 121 and back. Such circuits are well known and need not be described in further detail.

FIG. 4 shows an example of an amplitude comparator with pulse stretcher means that may be employed. The comparator 22 comprises two triodes 126 and 127 having cathode and anode output circuits connected in balanced relation so that if the successive pulses Pr are of equal amplitude the output will be zero. It will be understood that the delay line 21a delays the pulses passed through it by an amount substantially equal to the repetition period of the received pulses Pr so that the early and late gated pulses appear on the grids of tubes 126 and 127 simultaneously to make comparison possible.

The output of comparator 22 is zero if there is a balance condition; otherwise it is a plus or minus pulse. The output circuit of each comparator tube includes a blocking capacitor and also includes a filter for stretching or widening the pulse to effect better control. At the tube 126 the stretching filter comprises resistor 131 and capacitor 132; at the tube 127 it comprises the resistor 133 and capacitor 135.

The output voltage of comparator 22 may be applied to a cathode follower tube 134 having a filter 136, 137 in its output circuit whereby a d-c voltage appears on the lead 116 for biasing the delay multivibrator 113.

The d-c bias voltage on lead 116 is measured by a d-c voltmeter 18A which is calibrated in distance to the reflecting target. The voltmeter 18A functions as a range indicator since, as previously explained, the amount of gate pulse delay provided by the multivibrator 113 is a function of the bias applied to it.

The delay multivibrator 113 may be biased so that for some mid-range the range delay is correct when the output of the amplitude comparator 22 is zero. For any other range the comparator output is plus or minus thus supplying a correction bias voltage. A very small amount of this correction voltage will pull and hold the range delay multivibrator 113 to the correct range delay for the particular target distance. The range indicator meter will read in accordance with this corrected bias voltage.

From the foregoing it will be seen that the gating is done at a point in the circuit where the received pulse still has substantially the original wave form and, in particular, is still narrow in width. Thus, good definition in range is obtained. The fact that the gated pulses are broadened out or smeared at a later point in the circuit by the narrow pass band I.F. amplifier is not detrimental since the broadened pulses may be readily compared in amplitude.

It has been assumed in the foregoing description of the circuit operation that the amount of delay of the gate pulses has been set so that at least one gate pulse coincides with a received pulse. It is clear from the foregoing description how the early and late gate pulses lock in on the received target pulse and follow it as the target distance changes.

There are various ways in which the gate pulses may be shifted in timing to make them coincide and lock in with a received pulse. A simple way to do this is with a switch arm provided to connect the input circuit of cathode follower 22a either to the amplitude comparator 22 or to the tap of a potentiometer.

By throwing the switch arm, the voltage applied to the input circuit of cathode follower 22a may be varied by adjusting the potentiometer tap. This varies the timing of the gate pulses so that they can be shifted until they coincide with a received pulse. As soon as this occurs, it is evident from the reading of a voltmeter connected to the amplitude comparator 22. The siwtch arm is then moved to connect with the amplitude comparator 22 and the apparatus proceeds to track automatically on the target.

The voltmeter may be connected to any one of various points in the amplitude comparator circuit. In FIG. 4, it can be connected to the anode circuit of the tube 127. With this connection there will be a voltmeter reading as soon as one of the gate pulses occurs at the same time as a received pulse, since the received pulse will then be passed on to the comparator circuit.

FIG. 6 illustrates another satisfactory way of applying the gating pulses in accordance with the present invention. Here the gating pulses are applied to an early stage of the I.F. amplifier. The I.F. amplifier stages that follow the stage to which the gating pulses are applied are designed to pass only a comparatively narrow frequency band as previously discussed. In the particular example illustrated, the first and second I.F. amplifier stages 15a and 15b are wide band so as not to broaden the received pulses, and the gating pulses are applied to the second stage 15b. The remaining I.F. amplifier stages indicated at 15c are narrow pass band stages and, therefore, may be readily designed to provide high gain.

In order to avoid undesired transient effects resulting from the application of gating pulses, it is desirable to employ a balanced circuit at or immediately following the point at which gating pulses are applied. In FIG. 6, for example, the second I.F. amplifier stage 15b may be a balanced amplifier of the well-known push-pull type. The stage is normally biased to cut-off. The gating pulses of positive polarity are applied to drive the control grids of both tubes of the stage 15b less negative simultaneously so that the stage 15b passes signal for the duration of a gating pulse. Obviously, the gating pulses may be applied to the screen grids or to other control electrodes of the two tubes rather than to the control grids. Such techniques for balancing out transients due to gating or switching are well known in the art.

Similarly, in the circuit of FIG. 1 where the local oscillator 14 is gated, the converter or mixer 13 is preferably of the balanced detector type whereby transients due to gating are balanced out. FIG. 7 shows a suitable arrangement, by way of example. FIG. 7 shows schematically of this type employing crystal rectifiers 4 and 5. It will be understood that this illustration is schematic and that the actual circuit for reception of high frequencies would be designed in accordance with well known engineering practice. At the frequencies involved in the present example, the converter 13 preferably comprises a wave guide assembly rather than the lumped inductors indicated in the schematic showing. As an example of such a wave guide assembly, reference is made to the Magic-T Balanced Mixer described on pages 269 and 270 of Microwave Mixers by Pound, Radiation Laboratory Series, No. 16.

The local oscillator 14 may be of any suitable type. For example, it may be a reflex klystron having its control grid normally biassed negatively enough to prevent the klystron from oscillating. The gating pulses of positive polarity may be applied to the control grid to reduce the negative bias sufficiently during each gating pulse so that the kylstron oscillates during the application of each gating pulse. If preferred, the gating pulses may be applied to the reflector electrode of the klystron.

As shown in FIG. 8, the gating pulses may be applied to a radio frequency amplifier stage 3 if the system is provided with an RF amplifier. However, such an amplifier stage usually is omitted in systems operating at very high frequencies. If gating pulses are applied to an RF amplifier stage it may be made a stage of the balanced type to reduce transient effects as previously discussed, although these transient effects would be less pronounced in an RF amplifier.

In order to avoid any confusion with respect to the gate pulse width that might result from the fact that there is both an early gate pulse and a late gate pulse, it should be noted that the discussion in the foregoing pages regarding gate pulse width applies to either one of the gate pulses taken along. In other words, said discussion of gate pulse width applies to a single gating pulse such as the early gate pulse.

In addition to the foregoing comments it should be pointed out that regarding the gating pulse width, it is preferred that the width of the gating pulse employed for the purpose of definition or resolution should not exceed the width of the transmitted pulse by more than twenty or thirty per cent. Otherwise the transmitted pulse is unnecessarily narrow for the resolution that is to be obtained by the narrow gating pulse. However, the important point is that the resolution is determined by the gating pulse width in a system where the I.F. amplifier has a pass band width so narrow that it would spread out or widen pulses of the width of the transmitted pulses or of the resolution gating pulses. Therefore, it is within the scope of this invention to employ a resolution determining gating pulse of the desired width such as 0.05 $\mu$s and a substantially narrower transmitted pulse of a width such as 0.01 $\mu$s. Such a pulse width relation would not usually be desired since narrowing the transmitted pulse to such an extent with respect to the gating pulse would probably give no advantage, whereas it usually is increasingly difficult to produce pulses of sufficient power as such narrow widths are approached.

In the claims the expression "substantially the same width" is intended to include variations of about twenty or thirty per cent from exactly the same width.

What is claimed is:

1. A pulse-echo system comprising a transmitter for transmitting a narrow pulse of radio frequency energy, a receiver for receiving said pulse after reflection from a reflecting object, said receiver being of the superheterodyne type and comprising an intermediate frequency amplifier consisting of a plurality of amplifier stages and having a narrow frequency pass band, means for producing a gating pulse adjustable in timing and having a width sufficiently narrow to provide the desired definition or resolution, said gating pulse and said transmitted pulse having substantially the same width, said narrow frequency pass band being so narrow as to seriously distort or widen a pulse as narrow as said gating pulse if passed through the intermediate frequency amplifier, means for applying said gating pulse to said receiver at a point preceding the narrow pass band stages of said intermediate frequency amplifier to make said receiver effective to pass signal to said narrow pass band stages only during the application of said gating pulse, and means for obtaining distance information that is a function of the phasing or timing of said gating pulse whereby the distance to the reflecting object is obtained.

2. The invention according to claim 1, wherein the receiver includes a local oscillator, and wherein said means for applying the gating pulse to the receiver comprises means for applying said gating pulse to said local oscillator.

3. The invention according to claim 1, wherein the receiver includes a preamplifier stage having a comparatively wide frequency pass band, and wherein said means for applying the gating pulse to the receiver comprises means for applying said gating pulse to said preamplifier stage.

4. A pulse-echo system comprising a transmitter for transmitting a narrow pulse of radio frequency energy, a receiver for receiving said pulse after reflection from a reflecting object, said receiver being of the superheterodyne type and comprising an intermediate frequency amplifier consisting of a plurality of amplifier stages and having a narrow frequency pass band which is of insufficient width to pass the reflected pulse without substantially widening it, means for producing a gating pulse adjustable in timing and having a width sufficiently narrow to provide approximately the same definition that would be provided by the narrow reflected pulse if it were passed through the intermediate frequency amplifier without substantial widening said gating pulse and said transmitted pulse having substantially the same width, and means for applying said gating pulse to said receiver at a point preceding the narrow pass band stages of said intermediate frequency amplifier to make said receiver effective to pass signal to said narrow pass band stages only during the application of said gating pulse, and means for obtaining distance information that is a function of the timing of said gating pulse whereby the distance to the reflecting object is obtained.

5. A control and indicating circuit for electrical systems responsive to a succession of narrow width electrical pulses comprising a single channel through which said pulses are passed, said channel including an amplifier having a narrow pass band and having a gating circuit preceding said amplifier, means for producing gating pulses of substantially the same width as said narrow width pulses and that recur at the same frequency as said electrical pulses but which have alternate pulses starting late in the gating pulse repetition cycle, said narrow frequency pass band being so narrow as to seriously distort or widen a pulse as narrow as said gating pulse if passed through said amplifier, means for applying said gating pulses to said gating circuit whereby said electrical pulses appear in the output circuit of said channel when said electrical pulses and said gating pulses occur simultaneously or overlap in time, means for obtaining a control voltage that is a function of the relative amplitudes of two successive output pulses from said channel, and means for shifting the phase or timing of said gating pulses as a function of said control voltage and for holding said gating pulses in an overlapped time relation with respect to said electrical pulses, and means for obtaining distance information that is a function of the phasing or timing of said gating pulses.

6. A pulse-echo distance determining system comprising means for transmitting a succession of narrow width pulses at a recurring frequency, means for receiving said pulses after reflection from a distant object, said receiving means comprising narrow pass band amplifier means and a gating circuit that precedes said narrow frequency band amplifier means, means for producing early and late gating pulses that have substantially the same width as said transmitted pulses and that recur at the same frequency as the received pulses, said narrow frequency pass band being so narrow as to seriously distort or widen a pulse as narrow as said gating pulse if passed through said amplifier means, means for applying said gating pulses to said gating circuit whereby received pulses reflected from said object appear in the output circuit of the receiving means when said received pulses and said gating pulses occur simultaneously or overlap in time, means for obtaining a control voltage that is a function of the relative amplitudes of two successive output pulses from the receiving means, and means for shifting the phase or timing of said gating pulses as a function of said control voltage and for holding said gating pulses in an overlapped time relation with respect to the received pulses as the distance to said object changes, and means for obtaining distance information that is a function of the phasing or timing of said gating pulses whereby the distance to the reflecting object is obtained.

7. A pulse echo distance determining system comprising means for transmitting a succession of narrow width pulses at a recurring frequency, superheterodyne receiving means for receiving said pulses after reflection from a distant object, said receiving means comprising a narrow pass band intermediate frequency amplifier and a gating circuit that precedes said narrow band amplifier, means for producing early and late gating pulses that have substantially the same width as said transmitted pulses and that recur at the same frequency as the received pulses, said narrow frequency pass band being so narrow as to seriously distort or widen a pulse as narrow as said gating pulse if passed through the intermediate frequency amplifier, means for applying said gating pulses to said gating circuit whereby received pulses reflected from said object appear in the output circuit of the receiving means when said received pulses and said gating pulses occur simultaneously or overlap in time, means for obtaining a control voltage that is a function of the relative amplitudes of two successive output pulses from the receiving means, and means for shifting the phase or timing of said gating pulses as a function of said control voltage and for holding said gating pulses in an overlapped time relation with respect to the received pulses as the distance to said object changes, and means for obtaining distance information that is a function of the phasing or timing of said gating pulses whereby the distance to the reflecting object is obtained.

8. A pulse echo distance determining system comprising means for transmitting a succession of narrow width pulses at a recurring frequency, superheterodyne receiving means for receiving said pulses after reflection from a distant object, said receiving means comprising a narrow pass band intermediate frequency amplifier and a gating circuit that precedes said narrow band amplifier, the pass band of said amplifier having a band response in megacycles less than one-half the reciprocal of the width in microseconds of the transmitted pulses, means for producing early and late gating pulses that have substantially the same width as said transmitted pulses and that recur at the same frequency as the received pulses, means for applying said gating pulses to said gating circuit whereby received pulses reflected from said object appear in the output circuit of the receiving means when said received pulses and said gating pulses occur simultaneously or overlap in time, means for obtaining a control voltage that is a function of the relative amplitudes of two successive output pulses from the receiving means, and means for shifting the phase or timing of said gating pulses as a function of said control voltage and for holding said gating pulses in an overlapped time relation with respect to the received pulses as the distance to said object changes, and means for obtaining distance information that is a function of the phasing or timing of said gating pulses whereby the distance to the reflecting object is obtained.

* * * * *